A – CATHODE AT -2000V
B – GROUNDED CATHODE SHIELD
C – GROUNDED ANODE
D – MAGNETS
E – GLASS OR METAL VESSEL
F – MAGNETIC FLUX

United States Patent Office 3,282,815
Patented Nov. 1, 1966

3,282,815
MAGNETIC CONTROL OF FILM DEPOSITION
Eric Kay, Campbell, and Arthur P. Poenisch, San Jose, Calif., assignors to International Business Machines Corporation, New York, N.Y., a corporation of New York
Filed July 1, 1963, Ser. No. 291,736
7 Claims. (Cl. 204—192)

The present invention relates to a device for the sputtering of thin films and, more particularly, to systems for improving such evaporation through the use of balanced magnetic fields to control the transport mechanism. Thin film technology, despite its complexity and some inherent problems, offers workers in the art an attractive approach for the controlled deposition of thin films. The crystal morphology, thickness uniformity, and isotropic growth of crystals in certain thin film materials, can be controlled with unexcelled precision using sputtering systems, sometimes called "impact evaporation" systems and hereinafter referred to as such. This is of especial importance for magnetic applications since these characteristics contribute vitally to the magnetic properties of the resultant film.

One disadvantage of prior art impact evaporation systems has been a relatively slow rate of deposition. Another and related problem is the low ion current density of the eroding ions. The present invention provides a solution to these problems and enables workers in the art to increase ion densities at least one order of magnitude and to increase deposition rate even more, without introducing any serious new problems.

It has been realized that one way to increase the deposition rate of sputtered material is to increase the effective path of the electrons which generate the cathode-bombarding ions, since the statistical probability of an ion-producing collision increases with the increasing path of the electron. One suggested solution is to apply a unidirectional transverse magnetic field so as to curve these paths and hence lengthen them. However, this solution is an impractical one since it has the disadvantage of crowding the electrons, and thus the bombarding ions which they generate, to one side of the cathode and thereby destroy the symmetry of the deposited film. Symmetry is absolutely essential for magnetic and other types of thin films. The present invention provides a solution to the problem of increasing the electron path without the attendant disadvantage of destroying film symmetry.

A second method of increasing the rate of deposition is to lower the pressure within the sputtering vessel and hence increase the mean-free-path of the impact eroded particles diffusing to the substrate. However, a difficulty associated with this solution is that the Crookes Dark Space (CDS) elongates with decreasing pressure and hence, at some point, a "masking effect" occurs which destroys film uniformity. This occurs because homogeneous ionization is effectively prevented at a region where the substrate intrudes into the ionization zone, since the substrate distorts the field there and blanks out erosion in an area subtending the intrusion. A decreased erosion, usually at the center of the cathode, results in a void of sputtered film material on the "intruding" substrate area. This is called a "masking" or "shadow" effect. To avoid this, one must necessarily move the anode farther away from the cathode and thus lose the advantage of the extended mean-free-path. The present invention provides a means of increasing the rate of deposition without need for decreasing the pressure of the vessel and the consequent extension of the Crookes Dark Space. One way wherein it accomplishes this is to increase ionization and deposition rates by many times. Where prior art rates of deposition were on the order of 1 A./second, with the invention about 50 A./second is possible. Because of such increased symmetric ionization, the discharge can also be operated at lower pressures than possible without the magnetic field of the invention and still be compatible with thin film symmetry deposition requirements.

Sputtering systems which have been suggested use a magnetic field-generating means to extend the effective paths of the electrons. But these have necessarily involved placing this means inside the sputtering vessel and thereby enlarging the vessel while aggravating the pumpdown problem. The present invention not only provides a means for generating a novel magnetic field configuration, but also teaches a technique that dispenses with the need for locating the means inside the vessel and hence introduces no pumping or contamination problems.

The present invention not only provides novel magnetic means for sputtering devices, but also teaches how such means may be manipulated and positioned relative to the glow discharge to establish characteristic glow-zones (cf. FIG. 7) and move them relative to the electrodes for optimized deposition.

In addition, the magnetic means of the invention serve to increase sputtering efficiency when located according to the invention so as to optimally position the conventional zone of ionization relative to the field.

A further novel effect of using said magnetic means is to create a second and hitherto unknown zone of ionization which is also a controlling factor upon the sputtering rate.

The present invention solves the above problems and teaches new advantages to those skilled in the art of impact evaporation by providing a glow discharge device using a means for producing a magnetic field which includes a strong radially-symmetric, transverse component which increases particle density and rate of deposition, while film uniformity is maintained by locating this component at the maximum ionizaton zone.

Accordingly, it is an object of the present invention to improve the rate of impact evaporation by superposing radially-balanced transverse fields upon the discharge.

Such a balanced (or quadrupole) magnetic field has particular utility for cathode processes in an Abnormal Truncated Glow Discharge environment and offers a new and useful control for thin film growth from such plasma. Such quadrupole magnetic fields impressed upon the sputtering discharge can be a useful means of locating, selectively, these zones of ionization. These zones result from electron-atom collisions in the plasma and such fields may enhance the ionization procesess. Such quadrupole magnetic fields can insure a symmetric ion-current-density profile across the cathode surface. These magnetic quadrupole fields can also permit gas density, cathode fall potential and ion current density to be changed independently of each other while, in the prior art, one of them is determined by the other two. The application of such a field to a planar electrode configuration can readily produce an order-of-magnitude increase in ion current density at the cathode under constant voltage and gas density. This extends considerably the rate of erosion processes at the cathode and the resultant deposition rate at the substrate.

Therefore, a further object of the invention is to provide a quadrupole field to overcome the characteristic low sputtering and deposition rates at low pressures of about $10^{-4}$ Torr in a manner compatible with uniform thin film growth over a limited surface area. Increased rates are possible because this quadrupole field discourages deleterious back-diffusion to the cathode by inducing a longer mean-free-path of the cathode-ejected particles. The inventive sputtering environment moves out of the diffusion and into the molecular-flow transport mechanism, thereby eliminating most back-diffusion and resultant cathode contamination.

A further advantage of the low-pressure sputtering enhanced by the invention is that contamination of the film can be minimized. This is crucial, for example, in producing superconductive films where a few parts in one million of oxygen renders a film useless.

Yet another advantage produced by the inventive quadrupole or balanced, magnetic field is that of shortening the Crookes Dark Space and, therefore, making it possible to bring the substrate closer to the cathode without shadow effects producing film non-uniformities.

Therefore, it is one object of the present invention to increase sputter deposition rates, especially in low pressure environments by providing a balanced magnetic field properly located.

Another object of the invention is to increase particle density without injuring sputtered film uniformity by providing a quadrupole transverse magnetic field.

Yet another object is to extend the effective path of the electrons and hence generate more impact ions for impact evaporation, by superposing a quadrupole magnetic field upon the discharge.

Still another object of the invention is to improve sputtering rates by impressing a quadrupole magnetic field upon sputtering particles.

Another object is to optimally locate glow discharge zones using magnetic field means so as to enhance sputtering.

The foregoing and other objects, features and advantages of the invention will become apparent in the following more particular description of a preferred embodiment of the invention, as illustrated in the accompanying drawings, wherein.

Figure 6:
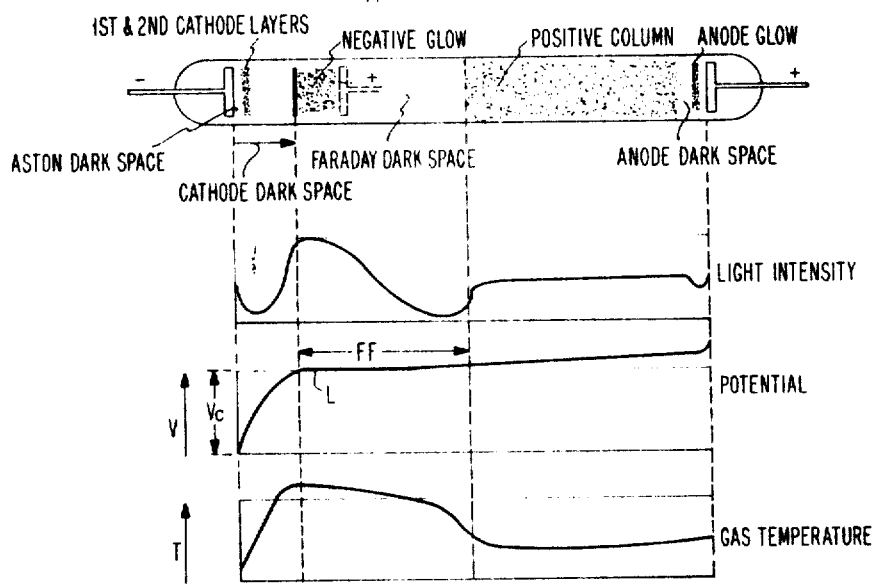
Figure 4:
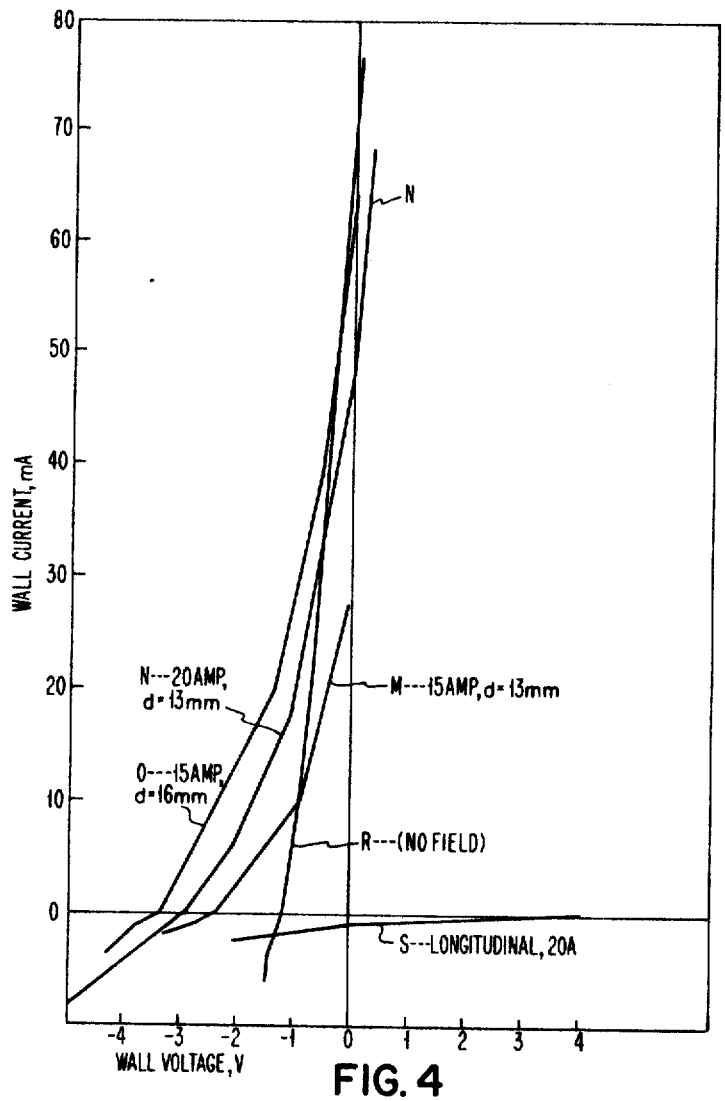
Figure 5:
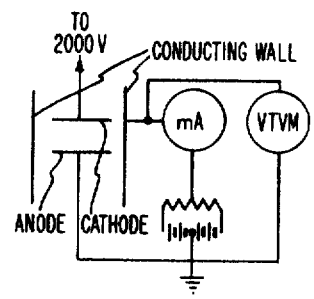
Figure 7:
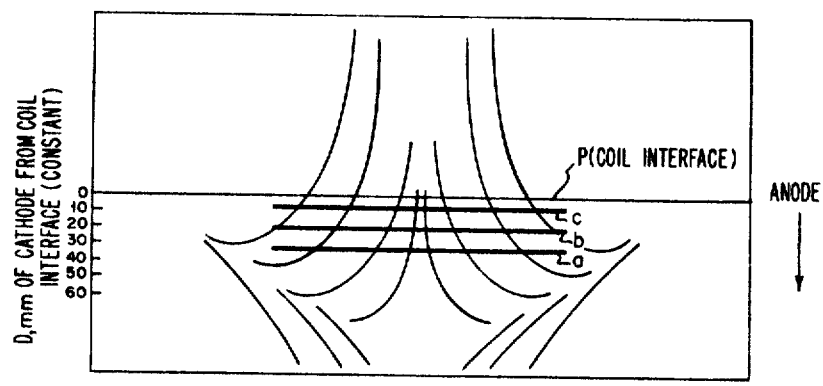
Figure 8:
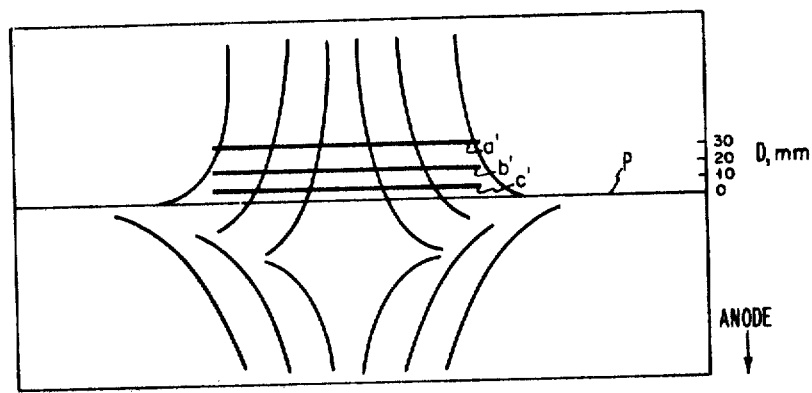
Figure 9:
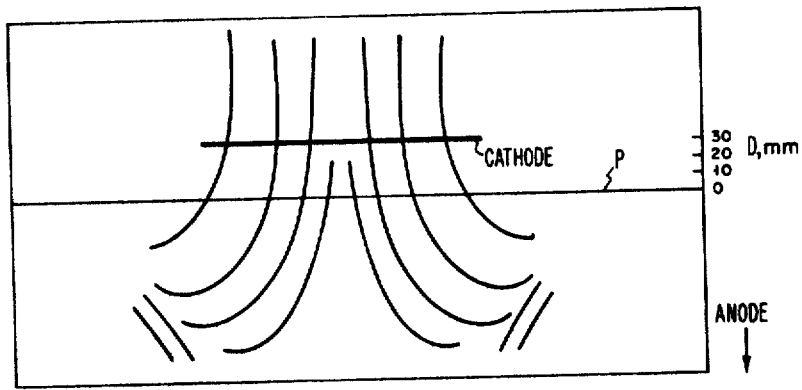
Figure 10:
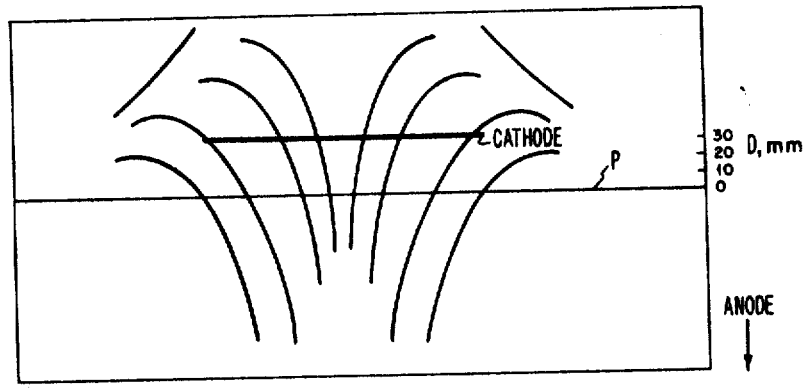
Figure 11:
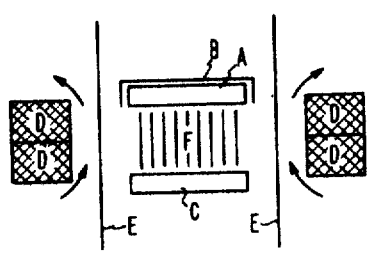
Figure 12:
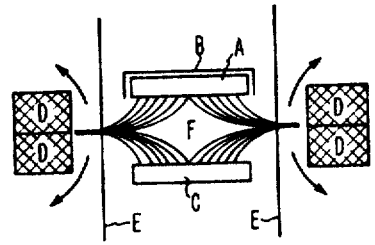
Figure 13:
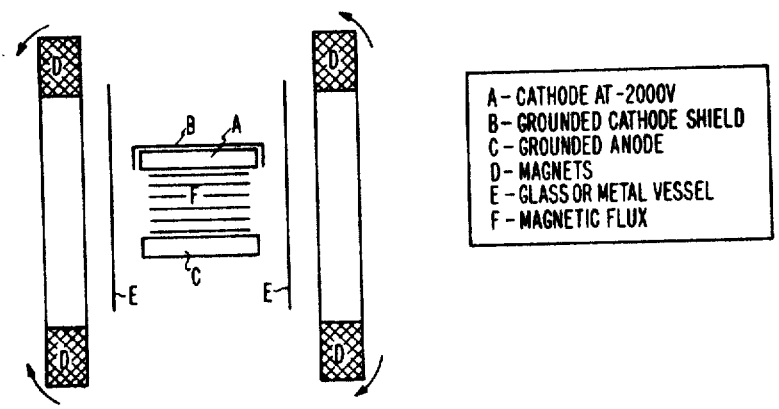
Figure 14:
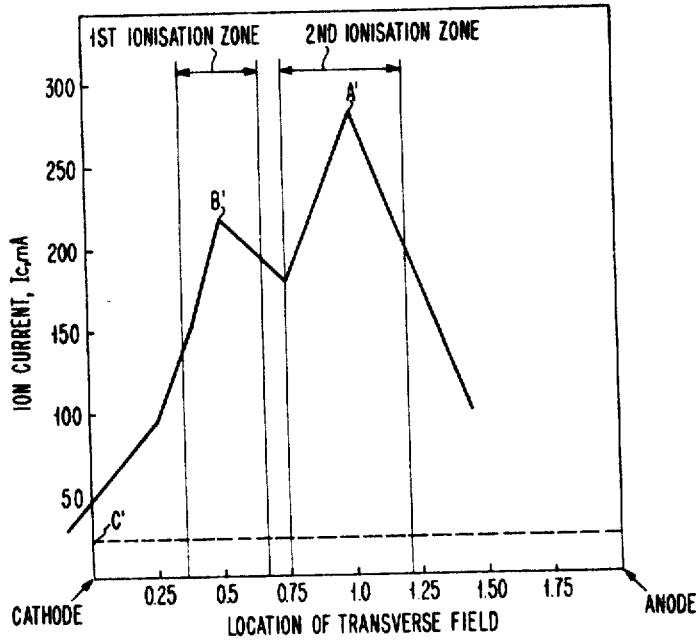

FIG. 4 plots voltage vs. current of vessel wall for various magnetic fields;

FIG. 5 schematically shows the means for plotting the curve in FIG. 4;

FIG. 6 shows the characteristic glow discharge regions and discharge parameters along the length of the discharge;

FIG. 7 is a map of the quadrupole magnetic fields of the invention with the field positions kept constant and cathode position shifted relative to this position;

FIG. 8 is a map similar to that of FIG. 7 with the shape of the fields modified;

FIG. 9 is a map similar to that of FIG. 8 with the shape of the fields further modified;

FIG. 10 is a map similar to that of FIG. 8 with the shape of the fields modified further;

FIG. 11 schematically indicates an idealized magnetic field of the longitudinal type;

FIG. 12 schematically indicates an idealized magnetic field of the quadrupole type;

FIG. 13 schematically indicates an idealized magnetic field of a unidirectional transverse type; and FIG. 14 is a plot of experimental data, showing the dependance of incidence ion current at the cathode upon the relative location of the transverse magnetic field component.

Figure 1:
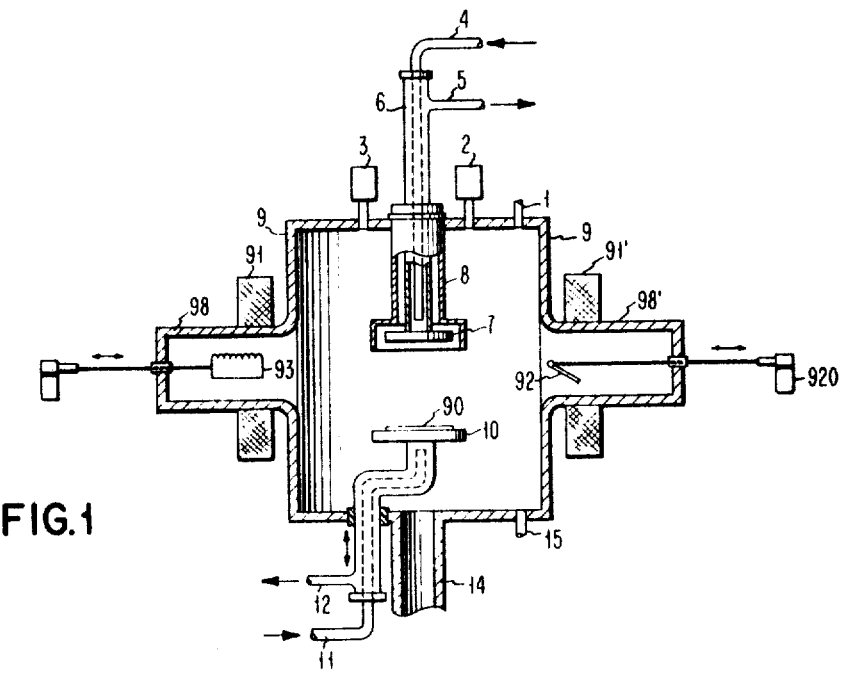
FIG. 1 shows the overall sputtering apparatus.

The setting wherein the invention is performed is best understood by reference to FIG. 1 wherein is shown the overall glow discharge apparatus configuration. The glow discharge apparatus is confined in a vessel 9 which is pressure-resistant so as to accommodate evacuation to pressures in the range of $10^{-1}$ to $10^{-7}$ Torr. Vessel 9 may be made of metal so as to readily distribute an electric charge.

In this embodiment, vessel 9 comprises a large glass tube of the configuration as shown in FIG. 1, in which the walls are at least 2″ from the perimeter of the anode to minimize "wall-effects," as described hereinafter. A bell jar could be used alternatively, but is not as appropriate since several ports, such as ports 98, 98' should be provided in the vessel wall as far from the discharge as possible and yet allow coils 91, 91' to be close to the discharge.

The cathode 7 of this two-electrode glow discharge apparatus is planar and made of the material to be transported, i.e., deposit material. However, it may optionally be merely overlaid with a sheet of the depository material, the basic configuration of the cathode being kept standard. A substrate 90 is affixed upon the face of anode 10. Anode 10 is, of course, adjustable in the cathode-anode axial direction so as to allow a change of axial location of the substrate mounted thereon. In joining substrate 90 to anode 10, it is important that the connection should provide good thermal conduction. Anode 10 may be of any conductive, heat resistant metal, such as aluminum. Both cathode and anode are water cooled so that their temperatures can be maintained constant and, if desired, as low as room temperature. Both electrodes are about 4½ inches in cross-sectional area. Cooling units are provided in jacket form within the base 6 of the cathode 7 and also within the anode 10. Any suitable coolant such as water may be pumped in at the cathode inlet 4, emerging at outlet 5 to be cooled and recirculated. Likewise, inlet 11 and outlet 12 provide the coolant for the anode 10. The cathode-anode potential drop can be varied between 0–5000 ev. using a 5KV–500 ma. low impedance filtered D.C. power supply. Desired glow-discharge effect occurs only in the pressure range of $10^{-1}$ to $10^{-4}$ mm. of Hg. But, in order to maintain a glow discharge in the lower pressure regions, where the mean-free-path of electrons is long, the ionization efficiency has to be increased. This may be done in several ways. One way is by superimposing a transverse external magnetic field on the discharge, thus increasing the effective path of the colliding electrons and hence the probable number of bombarding particles generated by these collisions. The quadrupole transverse field produced by coils $C_1$, $C_2$ accomplishes this according to the invention as noted below, and additionally prevents asymmetrical deposition. This field is better understood by considering FIGS. 11, 12 and 13 where it is generated by coils D.

The longitudinal, quadrupole magnetic fields produced by the two separate water-cooled coils $C_1$, $C_2$ are coaxial with the discharge and radially symmetric about it, influencing it considerably as explained hereinafter. The direction (polarity) of the magnetic fields can be changed by changing the direction of the current in the individual coils as noted in Table II. When the two quadrupole coils are arranged in opposing polarity, as is the preferred arrangement (see FIG. 2, $C_{101}$, $C_{102}$), a transverse field region, designated hereinafter as Line X (see FIG. 2), will occur where the axial components of the "bucking" fields cancel out. The locus of this region may be changed by adjusting the relative field strengths (coil current) or moving the coils. As FIGS. 7–10 demonstrate, the location of this region sharply influences deposition. The present invention involves teaching the provision and proper location of such a transverse field of the radially symmetric type, as particularly described somewhat later.

A unidirectional transverse field, on the other hand, may be provided for this sputtering apparatus by separating the coils and placing one on each side of the apparatus with their axis perpendicular to that of the electrodes, as schematically indicated in FIG. 13.

For establishing a "sputtering-vacuum," a diffusion pump is used to pump down to glow discharge pressures through outlet 14 and thereafter maintain constant pressure while clean flushing gas is being fed at port 15. But, ion current density is very sensitive to small pressure fluctuations. Therefore, the flow rate of inert gas through the system must be closely regulated by balancing the gas input from a reservoir (not shown) through port 15 with the output through outlet 14 to the pump. This is done by balancing the gas input through a variable leak, for instance, a double-needle valve against the pumping speed of the diffusion pump connected to outlet 14. This is superior to merely throttling the diffusion pump as done in the prior art. This diffusion pump is of the oil diffusion type and nitrogen trapped, having a capacity of about 700 liters per second and able to achieve a minimum pressure of about $1 \times 10^{-7}$ mm. Hg in this glow discharge chamber (i.e., in FIG. 1). The pressure is continuously monitored on the thermo-couple gauge which has been calibrated for argon gas using a McLeod gauge as a reference.

The glow discharge zones are contained according to the invention by the use, both of the quadrupole magnetic field and of appropriately charged and shaped shielding means. Such a shielding means 8 is shown in FIG. 1 as generally of a cup-configuration. When placed around planar cathode 7, shield 8 prevents discharge except normally from cathode face 7, toward anode 10. The shielding must be placed within the Crookes Dark Space (CDS) distance from the cathode assembly 6 or 7 to assure a discharge-free area between the cathode and the shielding. The anode 10, whose configuration is not critical, can be placed at varying distances from the cathode, within the range, for instance, of 6 mm. to 2.5 cm., beyond the "shadow-zone" it should be as close as possible for efficiency. The common glow discharge characteristics (e.g., current, pressure, voltage and geometry) are inter-related by well-established similarity laws. Such laws are explained, for instance, in the Encyclopedia of Physics, edited by E. Flugge (Springer-Verlag, Berlin, Germany, 1956, vol. 22). These zones and parameters are schematically plotted in FIG. 6 and described below.

Analytical evaluations of the films indicated superior sputtering with the inventive system and helped to monitor the control techniques introduced according to the invention.

Before describing the details of these sputtering control techniques, it is useful to consider the parameters whereby their effectiveness is measured. One such parameter and an important gauge of sputtering success is film thickness profile. The comprehensive nature of this property as an analytical method of delineating the uniformity of several film growth parameters makes it one of the most useful criterion for setting limits of control over these parameters. On a homogeneous substrate surface with no temperature gradients, areas of uniform film thickness qualitatively imply uniform rates of arrival of incident particles. Uniform incidence leads to uniform particle size and shape distribution in the resultant film, as well as crystallographic uniformity. Control over these particular parameters is especially important in the study of magnetic properties, as well as for all thin film production.

With commonly used planar glow discharge electrodes, having the parallel, planar electrode configuration (cf. FIG. 1), the thickness profile on a substrate will depend on a precise control of the transport mechanism of sputtered particles from the source (cathode) to the substrate.

The experimentally measurable quantities upon which the deposition thickness profile will depend are (1) the ion energy, current density, direction of incidence and the resultant erosion profile at the cathode surface; (2) the location of the end of the CDS; (3) the magnitude of the cathode fall potential; (4) the pressure and subsequent mean-free-path of sputtered particles; and (5) the proximity of the envelope walls with respect to the substrate. The parameters above are all related to one another and variation of any one of them will reflect itself in the thickness profile at the substrate in a logical fashion.

Related to deposition profile is the profile of the cathode erosion which generates the deposition. Further, the configuration of the erosion profile depends upon the ion current density profile. A radially-nonuniform ion current profile at the cathode will result in radially nonuniform cathode-erosion and deposition profiles. The ion current profile at the cathode will, in turn, depend on the electric field distribution near the cathode. This field distribution depends upon (1) the geometry of the cathode assembly and its position relative to the apparatus envelope; and (2) the distance of the substrate and anode assembly to the cathode. The invention specifies these parameters below, as optimized by the quadrupole field superposition.

Further details on the general incidents of sputtering and details of apparatus suitable for use with the invention herein may be found in co-pending U.S. application, Serial No. 290,794, filed June 26, 1963 entitled Deposition of Thin Film by Impact Evaporation, by Eric Kay, assigned in common with this case. Also relevant is the article: "Magnetic Field Effects on an Abnormal Truncated Glow Discharge and Their Relation to Sputtered Thin Film Growth," in the Journal of Applied Physics, April 1963.

The rate of film deposition is a very important thin film preparation parameter. It depends on the rate of ejection of particle from the cathode (source) at a fixed pressure and incident ion energy. The rate of ejection (or sputtering) from the source, in turn, depends mainly on the high energy incident ion current which gives rise to sputtering. The magnitude of this ion current depends upon the degree of ionization in the plasma. This ionization process can be increased considerably in a manner compatible with thin film technology only with the superposition of a symmetric quadrupole field of the invention. According to the invention, the superposition of the transverse component of a quadrupole field on certain narrow regions of the discharge plasma (optimum ionization zones) leads to the enhancement of sputtering and the subsequent deposition rate is optimized. We find that superposition of this type of field can move and attenuate the conventionally-known zone of optimum ionization. However, it also creates a second, new such zone, one of which is completely absent when no magnetic field is present which has never been reported before. The first narrow ionization zone (nearest the cathode) which is well known from earlier literature, moves considerably toward the cathode when this particular type of magnetic field is applied according to the invention. Since the effective ionization zones are only a few millimeters wide, it is obvious that the position of the transverse component of the magnetic field with respect to these zones is critical. The exact position of the two critical ionization zones is a function of many parameters such as voltage, pressure, magnitude of magnetic field in the plasma region, etc. The specific quantitative relation of these variables to zone position in any plasma is not yet known; however, the importance of properly locating these zones and applying the inventive quadrupole magnetic field as taught herein is unquestionable.

Figure 2:
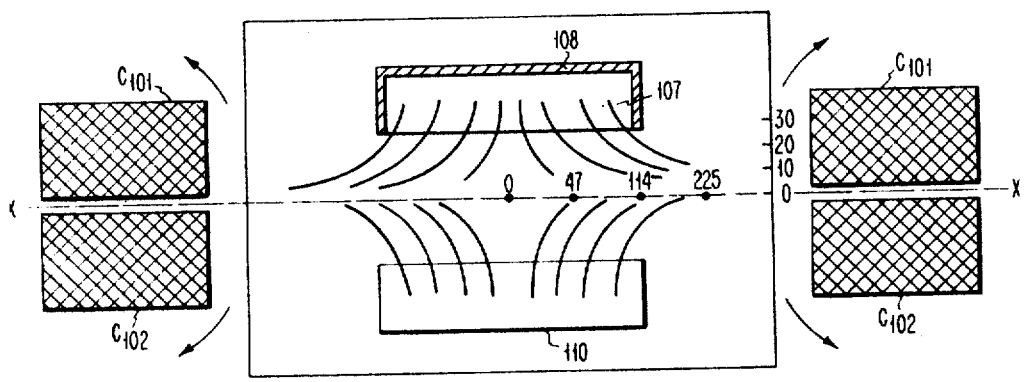
FIG. 2 shows the general quadrupole field including coils.
Figure 3:
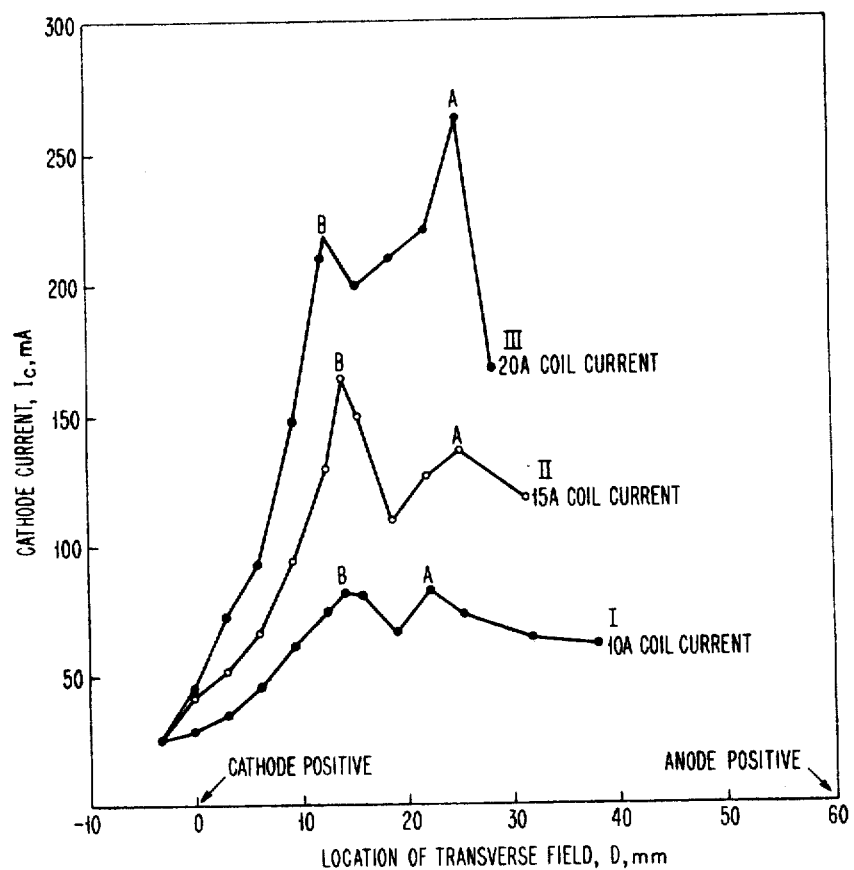
FIG. 3 is a plot of the position of quadrupole field axis along the glow discharge axis vs. various erosion-current levels associated therewith for different field strengths.

An actual plot of a representative version of the symmetric quadrupole field used is shown in FIG. 2 with the absolute field strengths along the indicated "equi-gaussian" lines are noted along the horizontal axis of symmetry. This quadrupole field of configuration was produced by opposing field coils $C_{101}$ and $C_{102}$ and was plotted with a Hall probe, the absolute gaussian field values being given there. It can be seen that the major transverse component of the field (Line X) is most pronounced along the axis of symmetry. Backing the cathode 107 away from Line X moves the well defined plasma zones (in a given discharge) lying in front of the cathode past Line X and modifies the deposition mechanism (cf. explanation below for FIGS. 7–10). As the major transverse field component is made to approach the region near the CDS-NG transition (shown in FIG. 6, for example), a maximum in ionization is predicted, since in this region are found a high density of electrons in an optimum energy range for ionization. This major transverse field component, Line X, will cause such electrons to elongate their paths (spiraling) and thus increase the number of ionizing collisions and, in turn, accelerate sputtering. Such increases are indicated in FIG. 3 at points "B" which represent ion-current maxima. Moreover, since the major transverse components are balanced according to the invention, this increase is achieved without destroying film uniformity.

Each of the three curves in FIG. 3 represents the variation of ion current (arriving at the cathode to erode it) as a function of cathode position (D) with respect to the location of the maximum transverse magnetic component (Line X in FIG. 2). All other glow discharge conditions are kept constant, of course (e.g., geometry, voltage, pressure). This location is determined either by adjusting relative coil current (cf. FIGS. 7–10) or by the position of the coils along the discharge. As expected, the ion current increases considerably with increasing magnetic field. (Compare curves I, II and III.) Thus, the strength of the quadrupole magnetic field can determine the size and location of this optimum ionization zone according to the invention and then the coils may be positioned so as to superpose the maximum transverse field components (Line X) upon this zone and thereby increase the sputtering rate.

Curves I, II and III also indicate that, besides manipulating the conventional optimum-ionization zone (zones of the "B" maxima), the symmetric quadrupole field of the invention gives rise to a second novel zone of optimum ionization (points A). This second zone is completely new and unexpected and appears to be capable of producing the greatest increase in the sputtering rate. This is especially evident from the "incident ion current—Line X position" curve in FIG. 14 (cf. point A'). This curve was derived from 2000 volt, 31 micron pressure sputtering conditions using an aluminum cathode. It is evident that when the major transverse field component (Line X) was positioned at this new second ionization zone (point A'), the enhancement in incident ion current was considerably greater than at the conventional first zone (point B'). Removal of the quadrupole field entirely leaves a much lower, constant ion current level (point C').

Reverting to FIG. 3 further shows that this second, new zone is a sharply-defined zone of ionization (zone A). It depends upon electron collision phenomena occurring several millimeters beyond the first zone (zone B), i.e., deeper in the NG region where electrons of suitable energy for ionization can be confined by the superposition of the quadrupole magnetic field. With increasing magnetic field, this zone becomes narrower (<5 mm.—see Curve III). The major transverse magnetic field component (Line X) can be moved back and forth along the discharge axis by producing a quadrupole field which, unlike that of FIG. 2, is asymmetric along the discharge axis but yet maintains a radial symmetry transverse to this axis. The fields in FIGS. 7–10 exhibit this asymmetry.

It is important to locate these narrow (few mm.) ionization zones exactly before sputtering so as to locate the inventive field means at one of them. It will be evident that a preliminary "trail discharge" for plotting ion current against the position (or relative current) of the coils, as demonstrated above, will accomplish this.

Points A on Curves I, II, and III in FIG. 3 particularly indicate that this critical zone of ionization moves closer to the cathode with increasing magnetic field. This is compatible with the observation that the CDS contracts under increasing field strength as discussed above. The shortened CDS will result in a reduction in charge transfer which results in higher energy incident ions at the cathode. This will be reflected in an increased sputtering rate at the cathode and, to a slightly lesser extent, a concomitant increase in the volume of depository material arriving at the anode. Inspection of Table I, below, in fact shows that for a 19-fold increase of incident ion current due to the superposition of quadrupole field, the cathode erosion rate has increased 34 times and the deposition rate increased almost as much.

TABLE I

*Discharge data with and without quadrupole magnetic field*

|  | Case A | Case B |
| --- | --- | --- |
| Quadrupole Magnetic Field, Amps | 0 | 20–20 |
| Voltage, V | 2,000 | 2,000 |
| Pressure, Torr | $3.2 \times 10^{-2}$ | $3.2 \times 10^{-2}$ |
| Anode Temperature, °C | 18 | 18 |
| Electrode Spacing, cm | 6 | 6 |
| Ion Current, ma | 8 | 150 |
| Cathode Erosion Rate, mg./s | 1.6 | 54 |
| Anode Deposition Rate, mg./s | 0.56 | 17 |
| Transport Efficiency, percent wt | 35 | 32 |
| Sputtering Ratio, atoms/ion | 0.76 | 1.26 |

It is interesting to note that the sputtering ratio, i.e., particles ejected per incident ion, increases from 0.77 to 1.26 when the field is applied (case B). This is further evidence that higher energy ions arrive at the cathode when the magnetic field of the invention is applied. The anode deposition rate is directly related to the erosion rate at the cathode and is not adversely affected by the application of a symmetric quadrupole magnetic field, because this field makes erosion symmetrical. The few particles that become charged would not be affected by the small magnetic field used here at any rate.

In summary, the evidence above demonstrates the new and improved sputtering effects achieved according to the invention. They show that superposition of a transverse magnetic field upon a sputtering discharge, so that the field is radially symmetric about the discharge axis, generates a new optimum ionization zone. Further, positioning the major transverse component of the field so as to overlie either zone of optimum ionization enhances cathode erosion, doing so in a radially symmetric manner and thus assuring deposition which is faster and more uniform than the art has hitherto known. While the quadrupole magnetic field has been described in the chosen embodiment, it will be apparent to those skilled in the art that any balanced or radially symmetric transverse magnetic field superimposed on the discharge according to the invention should derive these benefits. For example, one might alternatively revolve, at high frequency, a unidirectional transverse field, either mechanically or electrically around the common axis of the planar electrodes.

Positioning of the major transverse component of the magnetic field relative to the selected ionization zones along the discharge may, as mentioned earlier, be effected either by physically moving the field coils relative to the discharge elements or by changing the relative field strength of the coils (by adjusting coil current). The latter is done for the cases in Table II, below, relating ion current to "effective cathode position" for the field maps of FIGS. 7–10. These magnetic field maps in FIGS. 7–10, along with the conditions indicated in Table II, demonstrate how the major transverse magnetic field component can be moved up or down along the discharge axis by producing a quadrupole field which is asymmetric along the discharge (electrical field) axis, but yet maintains a radial symmetry along the horizontal axis. The fields are indicated as actually measured by the iso-gaussian lines plotted in FIGS. 7–10, wherein the transverse components are evident though somewhat schematically. Comparing the relative coil currents (in Table III) with the coil interface location for these maps, demonstrates how Line X may be moved in this manner without changing coil positions.

TABLE II

*Variation of cathode current ($I_c$) with magnetic field (see FIGS. 7, 8, 9, 10)*

| Case | Compare Map in Figure: | Current Amps | | Cathode Position D, mm. | Ion Current $I_c$, ma. |
|---|---|---|---|---|---|
| | | Top Coil | Bottom Coil | | |
| I | 7a | 10 | 15 | 32 | 60 |
| | 7b | 10 | 15 | 19 | 45 |
| | 7c | 10 | 15 | 6 | 26 |
| II | 8a' | 15 | 10 | 32 | 25 |
| | 8b' | 15 | 10 | 19 | 30 |
| | 8c' | 15 | 10 | 6 | 60 |
| III | 9 | 20 | 10 | 32 | 17 |
| IV | 10 | 10 | 20 | 32 | 17 |
| V | Cf. Figs. 2 and 3 (curve II especially). | 17.5 | 15 | 19 | 160 |
| VI | Cf. Fig. 11 | 20 | 20 | (¹) | 20 |
| VII | | 0 | 0 | | 13 |

¹ Longitudinal Field.

FIGS. 7–10 also indicate the existence of the above-mentioned zones of optimum ionization and demonstrate, by some typical test readings, the criticality dependence of ion current upon proximity of these zones to the major transverse component (Line X) according to the invention.

Some appreciation of the effect of the quadrupole field upon ion current may be had by comparing the ion current of Case VII (no magnetic field) with that of Cases I, II, and III (quadrupole field superposed in favorable locations). Cases III and IV are ignored since the field was so located as to be relatively ineffective. This comparison not only points up the advantage of the field per se, but also the criticality of locating Line X properly according to the invention.

Case I (FIG. 7) demonstrates that as the cathode is moved toward Line X (evidently in the 30–60 mm. region, though probably curved somewhat), ion current increases markedly. Case II (FIG. 8) confirms this. It might be pointed out that, here, the cathode is "effectively" relocated (at positions a, b, c, a', b', c') by moving the coils (line P is their interface) since this is more convenient. This, of course, effectively moves the cathode relative to the field and hence changes the separation distance between the ionization zones and Line X.

Cases III and IV (FIGS. 9 and 10) clearly indicate the importance of locating the cathode in the right position with respect to the major transverse field component. In neither case is this component close enough to either of the major ionization zones to be effective. The result is that very little increase in ion current is observed. One may conclude that it is of little advantage to impose a magnetic field on a sputter discharge unless it is located properly as taught by the invention.

The cathode ion currents ($I_c$) listed in Table II also indicate the existence of both ionization zones, and their influence upon cathode current when the transverse field is moved near them. In FIG. 7, only the ionization region nearest the cathode is affected as the cathode itself is moved past the major transverse field component. Comparing Map I with Case I, at D=6 mm. (Line $c$), neither of the ionization zones "see" the transverse field component (Line X) so that ion current is not too different from the "no-magnetic-field" case (Case V). However, at D=32 mm. (Line $a$), the ionization zone nearest the cathode does begin to "see" the transverse field with the ion current more than doubling. Comparing the conditions of FIG. 8, it will be observed that three cathode positions (a', b', c') are identical to FIG. 7, only Line X being moved, effectively, with similar effects upon ion current. Using similar reasoning, it can be seen that only the second ionization zone "sees" the transverse component, since as this zone is pulled farther away from the transverse component the current goes down uniformly with no second peak.

Case V, on the other hand, demonstrates a much greater increase in ion current as a result of locating the new, second ionization zone near Line X. FIG. 2 may be compared for these field conditions, as they are similar to those in FIGS. 2 and 3 (see especially Curve II, peak A). This great increase demonstrates the advantage of finding this second zone and using it according to the invention.

Thus, FIGS. 7–10, in conjunction with Table II, corroborate the inventive teaching that a radially symmetric transverse magnetic field markedly increases sputtering rates when it is located close enough to one of the above mentioned ionization zones. Further, the location is quite critical, ion current depending somewhat exponentially upon separation from Line X. Thirdly, one of these zones is created by the field itself and yields a greater sputtering improvement when located contiguous to Line X.

Associated with the above described magnetic field means of the invention is the novel technique of charging the vessel to a prescribed "wall potential" so that the net current flow to the container walls can be reduced to zero. Zero wall-current leads to higher ionization efficiencies, since no charged particles are trapped there and wasted. It also results in a significant reduction in contamination problems since the "wall-current particles" could unleash contaminants occluded to the wall. This is quite critical for some thin films.

The importance of charged particle current flowing to the wall, with respect to thin film growth, will become evident. One way of preventing this is by creating a magnetic wall in the discharge region. Consideration of FIG. 4 demonstrates the significance of this "magnetic wall" on the net current flowing to the container wall. The vessel wall, in this case, was a metal liner of 6 inches diameter and, as indicated in FIG. 5, was held at various voltages with respect to the potential. Purely longitudinal fields (shown in FIG. 11) of several hundred oersteds can provide such a magnetic wall which, in fact, reduces the net current to the container wall to zero even when the wall is at a positive potential of several volts (Line S, FIG. 4). In an analogous situation with no magnetic field, almost all the current would flow to the walls instead of the anode as seen in FIG. 4 (Line R). This indicates that the longitudinal magnetic field is keeping the electrons away from the wall as discussed earlier, in spite of the positive wall potential, the latter being necessary to reject the positive charges, which are essentially unaffected by the magnetic field. When the wall is kept negative with respect to the anode, the wall current should be a direct measure of ion current being attracted to the wall.

When using the quadrupole field of the invention, however, (curves M, N, O) the situation is somewhat different since charged particles will again be directed against the wall but the longitudinal magnetic field cannot be used to direct them away as above since this field would distort the quadrupole field, destroying its usefulness. Hence, the second means for preventing wall-current effects must be invoked according to the invention; namely, charging the vessel wall. It has been found that the magnitude of wall-potential necessary is a function of the strength (cf. FIG. 4 curves M and N) and location (compare curve O with curve M—different cathode locations, hence different discharge zone locations under identical fields) of the major transverse field component. FIG. 4 demonstrates the inventive teaching that by correct choice of the wall potential, the net current flow to the container walls can be reduced to zero. By comparing curves M and N (FIG. 4), it can be seen that, as the magnetic field is increased, electrons are being bent more effectively to the wall so that a higher negative potential is required to reject them. Comparing O with M indicates that the position of the well-defined discharge zones (varied by changing cathode position D), relative to the field shape and strength, will also determine to what degree electrons are bent to the wall which, in turn, will dictate how negative a potential is needed on the wall to reject them.

From the measurements shown in FIG. 4, it can be inferred that the sputtered metal deposit on the glass wall (used in most of the other experiments reported here) will float at a slightly negative potential except in the case of a longitudinal magnetic field where most electrons are being kept from the wall.

Thus, it is prescribed according to the invention that sputtering conditions may be improved, not only by a transverse, radially symmetric field upon the discharge in a particular manner, but also by charging the vessel walls so as to draw zero net current thereto. With the quadrupole fields of the invention, this potential has been seen to be a few volts negative, varying according to the field strength.

While the particular embodiments described above represent useful applications for the inventive magnetic field for sputtering thin, uniform films, such uses do not exhaust the possible applications of the invention, but will only serve to suggest others to those skilled in the art. Workers in the art will recognize, for instance, that the magnetic field of the invention is also advantageous for use with vac-ion (sputtering) pumps, since erosion and deposition rates are greatly increased, improving efficiency at both the upper and lower pressure levels.

In the broad sense, the inventive combination provides a means for improving ionization efficiency and, consequently, sputtering efficiency also, while maintaining erosion and deposition uniformity by extending the effective path of a sputter-initiating electron without lengthening its axial excursion and doing this in one of two advantageous discharge zones. Such a capability is advantageous in a multiplicity of plasma environments, one of which is the sputtering environment, as described above.

One alternative application for the invention is in plasma research wherein the better understanding of and more accurate control over glow discharge mechanisms offered by the invention makes the discharge environment a better diagnostic tool for plasma study. Plasma study is currently being hotly pursued as an aid in understanding the characteristics of charged particles for such applications as glow discharge lamps, gaseous lasers, high energy physics, etc. A closely related study area is research in the mechanics of secondary electron emission and of ion bombardment since ion bombardment causes secondary emission in the usual sputtering context and since the invention will help in controlling these. A study of a sputtered film is, indeed, the only practical way to distinguish sputter-ion current from sputtered secondary emission at the cathode.

The invention also provides a new way of locating ionization zones in a glow discharge, as well as a method for creating a new zone of sputter-ionization.

The invention offers workers in the film growth and crystalline study arts a broader range of deposited-film characteristics by providing a broader range of erosion and deposition rates.

The invention has utility beyond the film deposition arts, being useful for sputter-erosion as well. By increasing the erosion rate radically, it may be advantageously used for ion-etching (i.e., erosion of a surface by ion-bombardment through sputtering). Ion-etching is useful for very finely controlled leveling or the roughening (e.g., to improve adherence) of surfaces according to the selection of the energy and mass of incident ions.

For certain materials, such as refractories or multicomponent alloys which are difficult or impossible to deposit by other methods, sputtering is the most practical, if not the only method of film production. Vacuum evaporation, for instance, is not feasible with such materials. Hence, for these types of films, the invention provides radically increased deposition efficiency and wider versatility in deposition techniques.

Other applications for the invention will likewise suggest themselves to those skilled in the art.

While there have been described above and shown in the drawings various systems and methods for uniformly dispersing sputter electrons and improving their efficiency in an advantageous discharge zone and thereby improving the efficiency of the sputtering system and the uniformity of deposited films according to the invention, it is apparent that the various elements and steps may be modified or completely supplanted by the use or substitution of other known elements or arrangements of components within the skill of those versed in the art. Accordingly, the invention should be considered to include all modifications, variations and alternative forms falling within the scope of the appended claims.

We claim:
1. In a method of coating an article by sputtering including arranging said article within a closed vessel having a cathode and an anode and imposing within said vessel a suitable pressure of ionizable gas and a suitable anode-cathode voltage potential difference to thereby obtain abnormal glow discharge conditions therein, said discharge comprising electron-collision ionization of said ionizable gas and, in turn, ion-bombardment and impact-erosion of a surface of said cathode, as well as secondary electron emission at said cathode, said discharge thereby occurring about an axis centrally located and perpendicular to said surface of said cathode, the improvement comprising the steps of:
   superposing a magnetic field having a major transverse component substantially perpendicular to said discharge axis and radially symmetric thereabout;
   locating said major transverse component of said field at a point along said axis between said cathode and said anode within 60 mm. from said surface of said cathode to thereby increase the mean free path of said electrons; and
   positioning said article in the negative glow region of said discharge and within the bounds formed by said surface of said cathode, said bounds being viewed through forming a cylindrical surface extending parallel to said axis, to thereby provide uniform deposition thereon.

2. The method of claim 1 wherein said magnetic field comprises a quadrupole field.

3. The method of claim 2 wherein said locating step additionally comprises:
   locating said major transverse component of said field at the anode side of the Crookes Dark Space generated by said discharge.

4. The method of claim 3 including, additionally, the step of:
   charging the inner surface of said vessel so as to repel electrons and charged particles such that the net current flow to said surface is reduced to zero, thereby keeping them from dissipating against said surface, and thus improving the ionization rate and deposition rate and lowering the amount of contamination in the deposition due to sputtering of said surface.

5. The method of claim 2 wherein said locating step comprises:
   sweeping said major transverse component along said axis between said cathode and said anode;
   detecting incident ion current at said cathode as a function of the axial position of said major transverse component while keeping discharge conditions otherwise constant; and situating said major transverse component at approximately one of the detected positions defining a peak of incident ion current.

6. The method of claim 5 wherein said situating step comprises:

situating said major transverse component at approximately the position of maximum incident ion current.

7. The method of claim 2 wherein said locating step comprises:

locating said major transverse component of said field at approximately the position along said axis where application of said field results in maximum incident ion current at said cathode.

References Cited by the Examiner
UNITED STATES PATENTS 2,219,611   12/1940   Berghaus et al. _____ 204—192
2,305,758   10/1942   Berghaus et al. _____ 204—298

JOHN H. MACK, *Primary Examiner.*

R. MIHALEK, *Assistant Examiner.*